United States Patent [19]
Owens

[11] Patent Number: 5,816,009
[45] Date of Patent: *Oct. 6, 1998

[54] STRESS STEERING STRUCTURE

[75] Inventor: Charles R. Owens, Norwalk, Conn.

[73] Assignee: Hexas LLC, Alexandria, Va.

[ * ] Notice: The term of this patent shall not extend beyond the expiration date of Pat. No. 5,615,528.

[21] Appl. No.: 801,155

[22] Filed: Feb. 18, 1997

Related U.S. Application Data

[63] Continuation-in-part of Ser. No. 338,408, Nov. 14, 1994, Pat. No. 5,615,528.

[51] Int. Cl.⁶ ........................................................ E04L 1/00
[52] U.S. Cl. ........................... 52/576; 52/577; 52/DIG. 2; 52/DIG. 10; 249/61; 249/62; 425/DIG. 12; 428/542.8; 428/703; 264/317
[58] Field of Search ........................ 52/576, 577, DIG. 2, 52/DIG. 10; 249/61, 62; 264/317; 425/DIG. 12; 428/542.8, 703

[56] References Cited

U.S. PATENT DOCUMENTS

| | | |
|---|---|---|
| 948,541 | 2/1910 | Coleman . |
| 2,881,717 | 4/1959 | Fuller . |
| 2,905,113 | 9/1959 | Fuller . |
| 2,914,074 | 11/1959 | Fuller . |
| 2,986,241 | 5/1961 | Fuller . |
| 3,063,521 | 11/1962 | Fuller . |
| 3,229,437 | 1/1966 | Adie . |
| 3,354,591 | 11/1967 | Fuller . |
| 3,412,519 | 11/1968 | Brettingen . |
| 3,495,367 | 2/1970 | Kobayashi . |
| 3,810,336 | 5/1974 | Sadao . |
| 4,059,932 | 11/1977 | Resch . |
| 4,156,997 | 6/1979 | Decker . |
| 4,207,715 | 6/1980 | Kitrick . |
| 4,679,361 | 7/1987 | Yacoe . |
| 4,711,062 | 12/1987 | Gwilliam et al. . |
| 4,796,394 | 1/1989 | Chastain . |
| 5,070,673 | 12/1991 | Weisse . |
| 5,110,661 | 5/1992 | Groves . |
| 5,230,196 | 7/1993 | Ziegler . |
| 5,261,194 | 11/1993 | Roberts . |
| 5,329,737 | 7/1994 | Roberts et al. . |
| 5,331,779 | 7/1994 | Hing . |

FOREIGN PATENT DOCUMENTS

| | | |
|---|---|---|
| 816814 | 8/1937 | France . |
| 2135806 | 12/1972 | France . |
| 2155495 | 5/1973 | France . |

OTHER PUBLICATIONS

PT Bouwtechniek, vol. 37, No. 3, Mar. 1982 Rijswijk NL, pp. 21–25 Pieter Huybers 'Polyedrisch bouwen' –see Figs. 4, 23.

Bauwelt, No. 50, Dec. 1968 Berlin DE. pp. 1601–1607, Walter Kuhn 'Raumliches Bauen mit Elementen aus der Konkretisierung geometrischer Gitter' see p. 1602; FIG 3, see p. 1606; FIG. 6.

Cundy & Rollett, Mathematical Models, 1961, pp. 195–197.

*Primary Examiner*—Christopher Kent
*Attorney, Agent, or Firm*—McAulay Nissen Goldberg Kiel & Hand, LLP

[57] ABSTRACT

A load bearing structure having a set of uniform voids functions to resolve the forces imposed by developing compression in the material having the voids and minimizing the amount of tension developed in the material. The voids are deployed to encompass a matrix of points arranged such that each point is spaced an equal distance from twelve and only twelve adjacent matrix points. If the structure is considered to be composed of a closely packed set of hypothetical rhombic dodecahedra (RD) and the four-edge vertices of each of those hypothetical RDs is truncated, the result will be a set of cubic voids. The center of each of those cubic voids will define the matrix referred to above and the cubic voids will serve to provide the optimum resolution of stress which minimizes the development of tension in the material. One in four of the hypothetical RDs can be eliminated achieving the same force resolution in a structure containing less material. The shape and size of the voids can be varied with only slight loss in optimum stress resolution. Some voids can be omitted with only slight loss of optimum stress resolution.

30 Claims, 5 Drawing Sheets

STRESS STEERING STRUCTURE

CROSS-REFERENCE TO RELATED APPLICATION

This application is a continuation-in-part of U.S. patent application Ser. No. 08/338,408 filed Nov. 14, 1994, now U.S. Pat. No. 5,615,528.

BACKGROUND OF THE INVENTION

This invention relates in general to structures such as load bearing structures and more particularly to structures that provide an enhanced trade-off between the stress that can be safely carried in relation to the amount of material required for the structure.

This enhanced strength to weight ratio is the goal of a large number of designs including many of those proposed and constructed by Richard Buckminster Fuller.

In most contexts where load bearing structures are employed and especially in bridges and beams, in arches and trusses, failure occurs because of a failure in tension rather than in compression. Although the loads imposed primarily induce compressive stress in the material, that stress is resolved within the material by vectors which introduce tension. For example, a bridge subject to load on its upper surface will tend to deflect in such a fashion as to introduce a tension along its lower surface. Failure will occur because of a failure in tension.

To compensate for this effect, rods or fibers which are particularly strong in tension can be incorporated. Multiple ply and laminated materials having varied fiber orientation in different layers are frequently employed to resist tension. In some materials and in particular with ceramics, careful attention is paid to minimize grain boundaries where failure tends to appear.

Attention has been paid to developing materials which have great tensile strength for use in load bearing structures in such a way as to employ the tensile strength of these materials so that loads applied to the structure will be resolved, at least in part, by the tension created in these tension members. Such an approach is outlined in the Buckminster Fuller U.S. Pat. No. 3,354,591 issued in 1967. A more recent improvement on that structure is set forth in U.S. Pat. No. 4,207,715 issued in 1980. This combination of tension and compression members is also disclosed in the structure shown in U.S. Pat. No. 4,711,062 issued in 1987.

As a general rule, most cost effective materials of load bearing structures are far stronger in compression than in tension. This is true of concrete for example. The design of structures using such materials is widespread because of availability and reasonable cost. Accordingly, it is a major object of this invention to provide a structure which has an improved stress resolution performance using a material having greater compression strength than tensile strength.

It is a related purpose of this invention to provide an improved load bearing structure whose critical failure point will be a function of its strength in compression, rather than its strength in tension.

It is a further related purpose of this invention to provide a load bearing structure which for a predetermined failure point will require less material than is currently required by known structures.

BRIEF DESCRIPTION

This invention involves a unitary substance having a uniformly spaced set of predetermined voids. The voids are so spaced that stress is resolved within the structure in a way that minimizes the creation of tensile stress.

These voids are deployed in a particular fashion, uniformly throughout the structure, so that stress, which cannot be transmitted through the voids, is resolved around the voids in a fashion that minimizes the creation of tensile stress.

For present purposes, consider this unitary structure as if it were composed of a closely packed set of rhombic dodecahedra (RD). A set of equal dimension rhombic dodecahedra can be packed so as to completely fill the space involved without any voids. Such a packing is what is meant by referring to the set as a closely packed set. Six of the vertices of the RDs are four edge vertices and eight of the vertices are three edge vertices. If one now truncates each of the six four edge vertices at approximately the mid-point of the edges, one then obtains a truncated rhombic dodecahedron (hereinafter TRD) which is the basic solid unit for purposes of analysis of this invention.

In one embodiment, the voids in the load bearing structures are the voids left by such a truncation of the four edge vertices of the closely packed solid RDs.

Obviously, among congruent sets, the size of these hypothetical RDs can vary appreciably. It is important that there be a large number of hypothetical RDs so that there are a large number of voids. The voids left by the truncated four edge vertices will be uniformly spaced throughout the structure.

In order to visualize the above, it has to be kept in mind that in a closely packed set of RDs, not only are there no voids but adjacent RDs have coincident four edge vertices and coincident three edge vertices. Thus a truncation of the four edge vertices of closely packed RDs create a void in the form of a cube.

Essentially, these cubic voids prevent the resolutions of stress along the "imaginary" adjacent edges of the RDs and require resolutions of stress through zones which involve the "faces" of the adjacent RDs. The result is that stress is resolved in a fashion that minimizes the generation of tension.

DEFINITIONS

Rhombic Dodecahedron (RD)

The rhombic dodecahedron, like the cube, is a space filling structure. That is, a set of identical rhombic dodecahedra (RDs) can be stacked so as to completely fill the space they encompass without any voids. The RD has twelve rhombic surfaces; that is, all four edges of the rhombus are equal. It has twelve surfaces and fourteen vertices. Six of the vertices are formed by four edges and eight of the vertices are formed by three edges. One can consider a unitary substance to be composed of a set of any single arbitrarily sized, identical, closely packed, rhombic dodecahedra. One can conceptually impose such a set on a unitary substance.

Truncated Rhombic Dodecahedron (TRD)

This is the term applied herein to the RD on which the six four edge vertices of a space filling set of conceptual RDs are truncated. Truncating each of the six four edge vertices of each RD at approximately the mid point of the edge and removing the truncated portions from the substance provides one-sixth of a cubic void. The six voids at each point result in a set of cubic voids. These are the cubic voids 12 shown in FIGS. 1 and 2.

The truncation is preferably at the point on the edge of the RD which provides a TRD in which all edges are equal. FIGS. 4 and 5 illustrate two views of a TRD. The TRD has twelve hexagonal faces and six square faces. The ideal TRD has forty-eight equal edges. All vertices are three-edge vertices.

In the FIG. 1 structure described herein, one out of four of the conceptually imposed TRDs are removed to form the TRD voids 14.

Matrix

As used herein, the term "matrix of points" refers to a set of points arranged in a three dimensional fashion. The set of points are a three dimensional matrix of points. It is useful herein to refer to the matrix of points because of the relation of the voids to the points. Both the voids 12 and the voids 14, are centered on these matrix points.

It has to be kept in mind that the matrix of points on which the cubic voids 12 are centered is a different matrix than the matrix of points on which the TRD voids 14 are centered. The matrices of points are not orthogonal matrices. In any given matrix, the distance between adjacent points is identical. The magnitude of that distance can vary greatly.

There are two distinct forms of matrix wherein each point is spaced an equal distance from exactly twelve adjacent matrix points. In one form, the points of the matrix form a cubic close-packed lattice (also known as face-centered cubic) and in another form the matrix points form a hexagonal close-packed lattice. These lattices are described, for example, in Cundy, *Mathematical Models,* 2nd ed. (Clarendon Press: Oxford, 1961), pp. 195–196, incorporated herein by reference.

In a cubic close-packed lattice, where the minimum distance between adjacent points is A, there are exactly twelve points at distance A from any one point. The next set of points is at distance $A\sqrt{2}$ (approximately 1.414·A) from any selected lattice point. There are exactly six points at distance $A\sqrt{2}$ from any one point. If a subset of matrix points of the cubic close-packed lattice is formed such that the subset includes one-fourth of the points of the matrix, and such that the members of the subset are equally spaced from their six neighboring points, the result is a set of points arranged in a cubic lattice with a distance of $A\sqrt{2}$ between adjacent points.

A first matrix is defined by the set of points that constitute the four edge vertices of a set of closely packed, space filling RDs.

A second matrix is defined by the set of points that constitute the center points of the same set of closely packed, space filling RDs.

Size Of RD And TRD

The RDs and TRDs referred to herein are not specified in size. That is because a unitary substance can be mathematically divided into a closely packed set of congruent RDs of any size. It is only important that the size of the geometric RD be small enough so that a large number, preferably hundreds, fit within the structure constructed.

BRIEF DESCRIPTION OF THE FIGURES

FIG. 1 shows members 12 of a first set of voids as cubic voids and members 14 of a second set of voids as truncated rhombic dodecahedra (TRD). In reviewing FIG. 1, it helps to keep in mind that each TRD void 14 has six square surfaces. Thus each TRD void is in communication with six cubic voids. In addition, a certain number of the cubic voids such as the voids 12A are not in communication with any other void in this FIG. 1 embodiment. All of the volume of the substance, except for the voids shown, is filled with material of the substance involved.

FIG. 3 shows only a single race of preform elements 16. The actual preform, like the actual structure, would have a three dimensional set of elements 16 to establish a three dimensional set of voids 12 in the structure.

DESCRIPTIONS OF THE PREFERRED EMBODIMENTS

The load bearing structure of this invention is an appropriate substance 10, such as concrete, which is preferably substantially unitary and which contains a particular set of voids. It is found that this particular set of voids causes such steering and resolution of induced stress on the load bearing structure as to minimize the development of tension in the substance involved. Thus a material such as concrete which is strong in compression and weak in tension will withstand applied loads until it fails in compression.

Some of the reasons why this desirable resolution of forces occurs are discussed under the heading "Some Theory Of Operation". At this point, the discussion herein is for the purpose of teaching how to construct the inventive structure.

It may help in visualizing the relationship between the voids generated by this invention by considering the rhombic dodecahedron (RD) as set forth in the Definitions and then consider the truncated RD (TRD) as set forth in the Definitions.

The hypothetical set of space filling RDs provide a first matrix of points defined by the four edge vertices of that set of RDs. The set of RDs with each four edge vertex truncated provide a set of imaginary TRDs with actual cubic voids. This is the set of voids 12 represented by FIG. 2 and the preform of FIG. 3.

In one useful arrangement, the hypothetical edges of the TRDs are equal to one another. This means that 46.41 percent of the edge length extending from the four edge vertex is the point at which truncation occurs. However, as long as there is a meaningful void at these four-edge vertices, the nature of the stress resolution will tend to minimize the development of tension.

In a preferred embodiment, each four edge vertex of the set of RDs is truncated at the midpoint of the edges. This means that 50 percent of the edge length extending from the four-edge vertex is the point at which truncation occurs.

Figure 1:
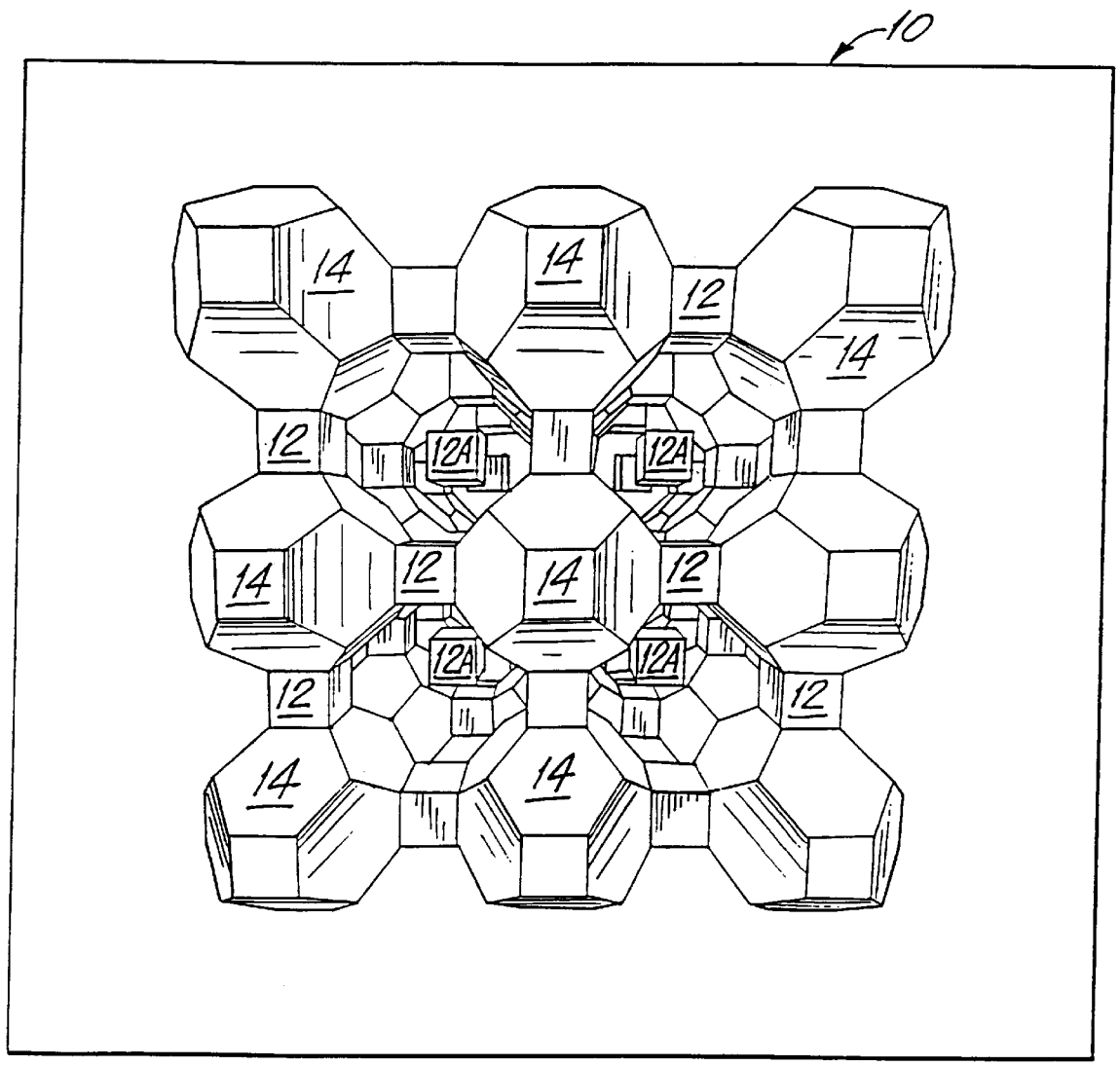
FIG. 1 is a geometric perspective view of a segment of the optimum void structure of a load bearing substance of this invention.

It then turns out that a subset of the TRDs, consisting of one in four of these hypothetical TRDs, arranged in a cubic lattice, can be made as a void in order to create the structure represented by FIG. 1.

This means that the structure shown in FIG. 1 has four cubic voids 12 for each TRD void 14. This structure provides the maximum reduction in the development of tension. It does so with a minimum amount of material required for the unitary substance.

One modification of the optimum arrangement shown in FIG. 1 immediately commends itself and, from a practical point of view, provides one of the preferred embodiments. That is a modification that omits those cubic voids 12A which are not in communication with the rest of the void structure. This eliminates one out of every four cubic voids 12. It is expected to have only a minimal impact on the advantageous resolution of stress yet it would make the construction of a preform much easier.

The FIG. 1 arrangement of voids with the omission of the "floating" cubic voids 12A can be considered the negative of a segment of a preform that could be used for making a preferred embodiment.

Figure 2:
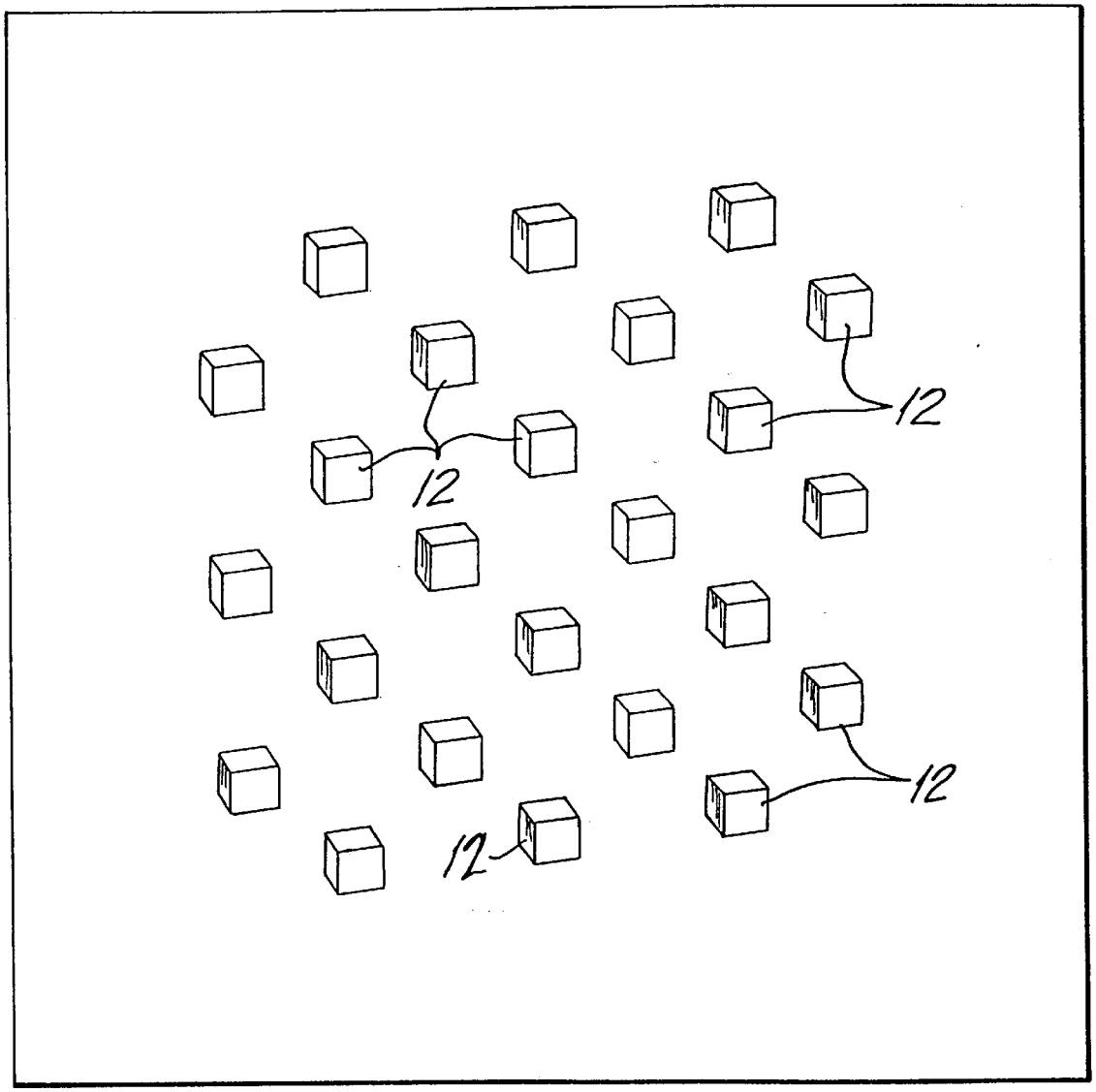
FIG. 2 is a geometric perspective representation of a segment of a second embodiment of this invention in which only the cubic voids 12 are retained and the truncated rhombic dodecahedra voids 14 are omitted. Accordingly, the space taken by the TRD voids 14 in FIG. 1 are filled in FIG. 2 with the material of the structure.

The critical voids for guiding and resolving the stress in the optimum fashion to reduce developing tension in the material are the cubic voids 12. Thus the FIG. 2 embodiment is a further preferred embodiment. FIG. 2 is the FIG. 1 arrangement with the TRD voids 14 eliminated. That is, the TRD voids 14 are filled in with the material of the structure. The FIG. 2 embodiment provides essentially as optimum a resolution of forces as does the FIG. 1 embodiment. However, it does so with a less efficient use of material.

Figure 3:
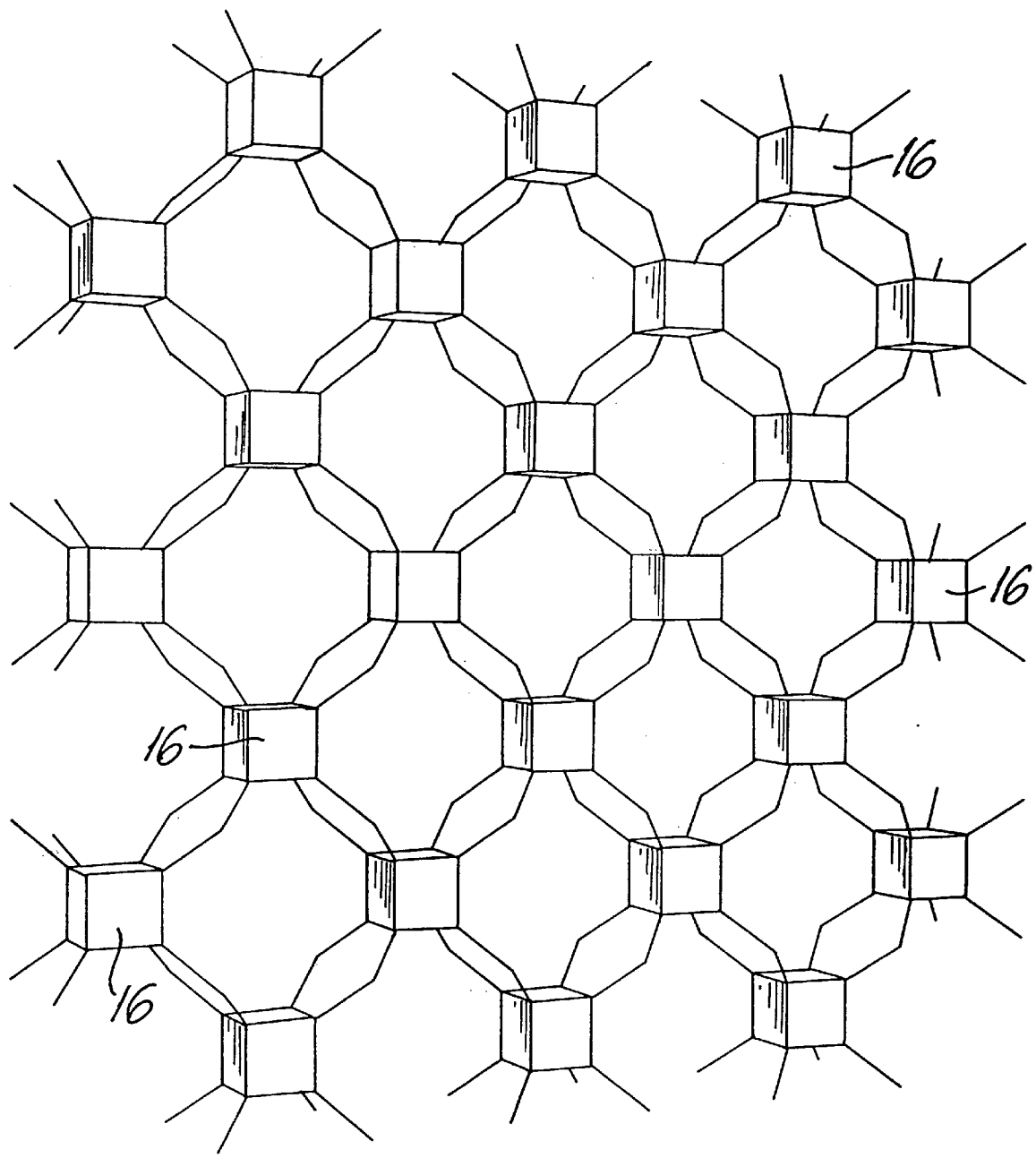
FIG. 3 is a perspective view showing a segment of a preform that could be used to create the FIG. 2 structure.
Figure 4:
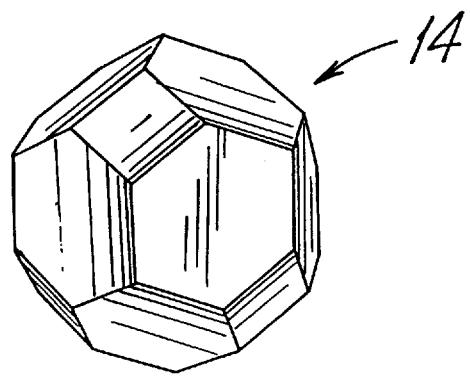
FIGS. 4 and 5 are perspective views of the truncated rhombic dodecahedra which constitute the elements of the second set of voids; such as the voids 14 shown in FIG. 1.
Figure 5:
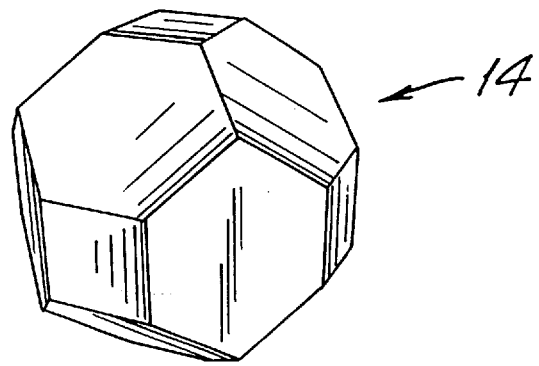

FIG. 3 illustrates a segment of a preform that can be used to fabricate or mold the FIG. 2 embodiment. Each cubic element 16 of the preform could be made of a non-structural material that will not transmit force and thus perform as if the void were air. The material of the elements 16 can either be left in place in the structure, as long as the material is less stiff than is the load bearing material of the structure, or the elements 16 can be volatilized during and/or after molding. It should be understood herein that the term void means a three-dimensional zone through which forces are not transmitted.

It should be kept in mind that the center point of each cubic void is equally spaced from the center points of the twelve cubic voids which surround any one cubic void. This relationship applies to any cubic void that may be selected throughout the structure. Where the cubic voids are arranged as voids within a closely packed set of TRDs, the matrix of points forming the centers of the cubic voids is arranged in a cubic close-packed matrix, or face-centered cubic matrix.

Similarly, the center point of each TRD void 14 is spaced an equal distance from the center points of the six TRD voids 14 that surround it. This relationship is maintained throughout the structure.

Although an optimum design will place an appropriately sized void at each matrix point, it should be appreciated that to provide the appropriate resolution of forces there must be a large number of voids 12 at matrix points. The larger the number of matrix points encompassed by voids 12, the better will the structures of this invention operate. As long as there are a large number of voids, the fact that some of the matrix points are not encompassed by a void will only cause minor degradation in the performance of the structures involved.

There is a continuum from an optimum performance down to a lesser performance which is a function of how many of the parameters of the optimum design are not fully met. Those parameters include; (a.) a void 12 at each matrix point; (b.) the size of the void 12, wherein the optimum is a cube as defined herein; (c.) the orientation of the cubic voids and (d.) the inclusion of the TRD set of voids 14.

The cubic void 12 is of particular interest because there appears to be some optimization of the resolution of stress if the set of cubic voids are oriented so that one of the corner to corner axes of each void 12 is substantially perpendicular to the load bearing surface of the structure involved. It is not clear how important it is from a practical engineering point of view that this orientation be sought. Experimentation with different materials and marginal design should indicate how much additional performance advantage will be obtained from such orientation.

The Octetruss

The octetruss taught by Buckminster Fuller, as exemplified in his U.S. Pat. No. 2,986,241 issued May 30, 1961, is a particular truss design in which an applied force will resolve in a more favorable fashion than in prior known structures. As a consequence, the framework defined by an octetruss provides strength greater than would be expected based on certain presumed resolutions of forces. Although the analogy may not be complete, Applicant believes that to some extent, the solid unitary structure taught herein is one that can be analogized to an octetruss in which the openings have been filled in except for certain critical zones; namely the voids 12 of this invention. These voids 12 assure that the transmission of stress will provide an enhanced resolution that reduces the development of tension in the structure. One reason the analogy to the octetruss is limited is that the Fuller design uses additional bars to obtain stability. The stability of the design of this invention arises from the fact that it is a solid material 10 having only the voids 12, 14 deployed as explained herein. But to facilitate thinking about some aspects of this invention, one can consider it to be similar to an octetruss with very thick bars.

Mixed Structures

The stress steering structure of this invention, which is a unitary substance 10 having the set of voids described above, may be employed as a portion of an overall construction or as a portion of a load bearing structure. For example, the middle third of a beam might be composed of the FIG. 1 or FIG. 2 structure thereby greatly enhancing the functioning of the beam.

As another example, a beam, or other structure, might be laminated out of a number of different materials one or more of which are the structure of this invention, thereby providing an enhanced laminated product without necessarily incorporating the structure of this invention throughout the entire product.

The structure of this invention provides the capability of creating an entire load bearing structure in accordance with the teachings of this invention or the capability of incorporating structural sub-units created in accordance with the teaching of this invention. The zones of failure resulting in the highest concentration of tension might be zones which are best replaced with the structures of this invention.

Void Volume

In an optimal design such as that shown in FIG. 1, approximately 6.25 percent of the volume of the structure is constituted by the cubic set of voids 12. Further, in FIG. 1, 23.44 percent of the volume of the structure is constituted by the second set of voids 14; that is, one out of four of the TRDs are voids. Accordingly, in the FIG. 1 structure, 29.69 percent of the volume is voids. These void volume percentages for an optimal design hold regardless of the predetermined distance between matrix points.

One in four of the cubic voids 12 are floating voids 12A. If the floating voids 12A are eliminated, the percentage of the total volume that is constituted by cubic voids is 4.69 percent and the percentage of the entire structure that is constituted by voids 12 and 14 is 28.125 percent.

In the second embodiment, shown in FIG. 2, the cubic voids optimally constitute 6.25 percent of the material out of which the structure of this invention is made. From a theoretical point of view, where the cubic void is created so that the four-edge vertex edges of the hypothetical TRD are truncated at the midpoints thereof, the volume of these cubic voids is 6.25 percent.

As a practical matter, appreciable variation can be had in the size and even in the shape of these voids with relatively little degradation in the optimum performance of structures built in accordance with the teaching of this invention. That is, a substantial variation in the size and shape of these voids can be accommodated with only a minor reduction in the ability of the material to avoid developing tensile stress.

In general terms, any significant void around the points which constitutes the center of the cubic voids 12 of FIGS. 1 and 2 will serve to prevent stress from being transmitted through those points and will serve to guide the stress in a fashion that minimizes generation of tensile stress. Experimentation is required to show how fast the drop off of performance will be as the size and shape of these voids is changed. The precise selection of void size and shape can be a function of the strength required for the particular application.

In addition, some of the cubic voids 12 can be omitted without serious degradation of performance. It is contemplated that in one preferred practical embodiment, approximately one-fourth of the cubic voids will be eliminated; namely the floating voids 12A of the FIG. 1 embodiment. As long as there are a substantial number of these voids 12 properly positioned at the matrix points, the stress resolution as taught by this invention will be achieved. The number of voids that can be omitted will be a function of the requirements of particular applications. What is important is that a sufficiently large number of voids be in existence which are surrounded by other voids such that there are at least twelve surrounding voids equally spaced from the void under consideration. These overlapping subsets of thirteen voids 12 are what provide the stress resolution functioning of this invention. As long as there are a substantial number of these overlapping thirteen member subsets, the development of tensile stress will be minimized.

Applicant believes that if the voids are all precisely located to encompass each matrix point and are equal in size, then the size of the voids may be substantially reduced from the optimum size indicated in this disclosure. Applicant believes that a set of voids, each one of which is one-fifth the volume of the optimum void size will provide a meaningful and useful embodiment of this invention. Applicant believes that the appropriate placement of the voids and the number of the voids is more important than the size of the voids.

Increasing the size of the voids 12 as a percentage of the material provides a design that employs less material and results in a lighter structure. Thus, it is contemplated that a stress steering structure may be provided having cubic voids approaching a volume of up to fifty percent of the material.

Figure 6A:
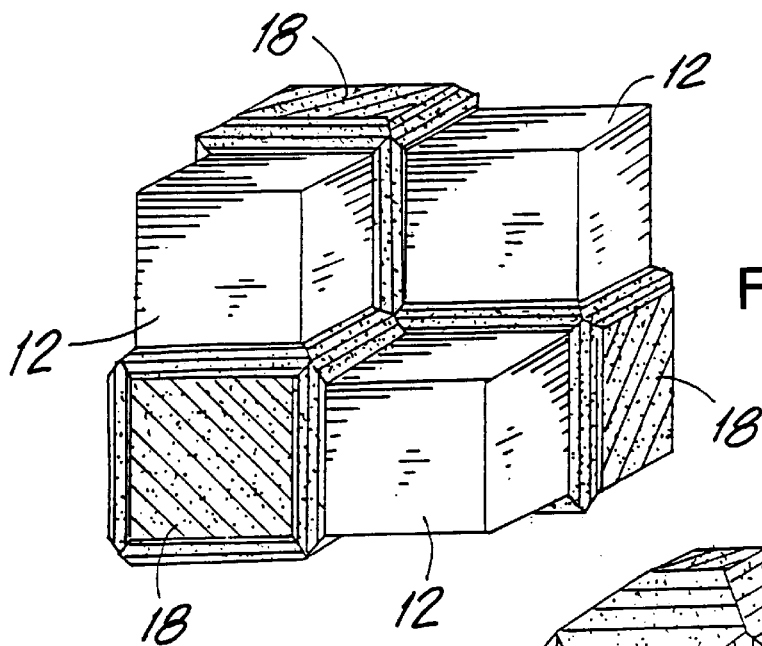
FIGS. 6A through 6C are perspective cross-sectional views of sections of load bearing substances having differing cubic void sizes.
Figure 6B:
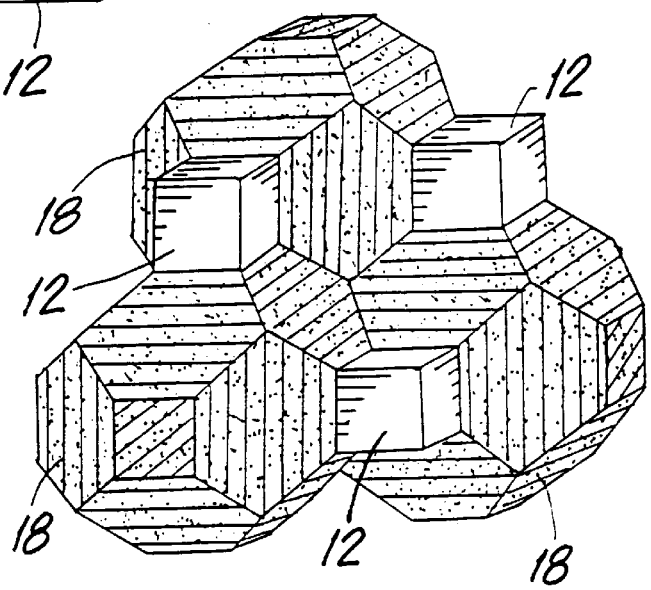
Figure 6C:
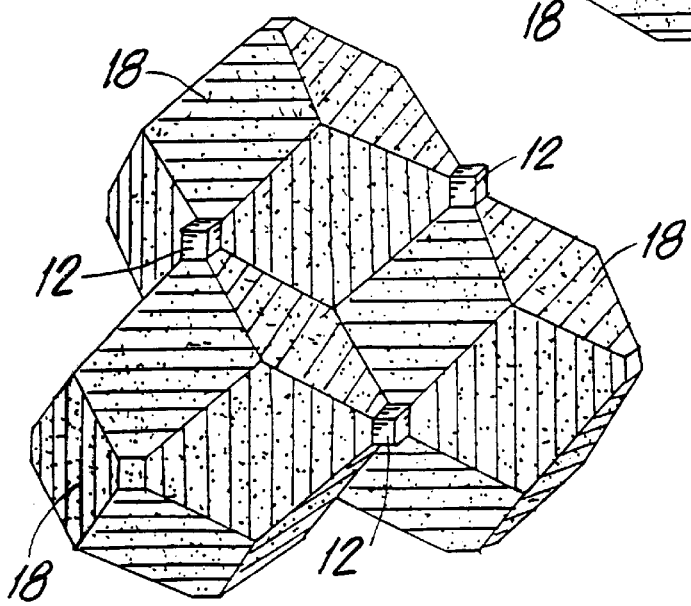

A range of void sizes is illustrated in FIGS. 6A through 6C. Each one of FIGS. 6A through 6C illustrates three cubic voids 12 and three solid TRDs 18. In each of the figures, the cubic voids 12 are defined by the spaces between illustrated solid TRDs 18 and additional TRDs (not illustrated) closely packed with TRDs 18. In FIG. 6A, cubic voids 12 constitute approximately 48 percent of the structure, in FIG. 6B, voids 12 constitute between 4 and 7 percent, (approximately 5 percent) of the structure, and in FIG. 6C, voids 12 constitute approximately one percent of the structure.

Void Fill

It is important that the voids not transmit force. As used herein, the term void means a three dimensional zone through which stress is substantially not transmitted. The void can be filled with air or any relatively soft material. What is a relatively soft material is a function of the substance out of which the load bearing structure is made. Essentially, as long as the material in the void is substantially less stiff than is the material of the load bearing structure, it will not transmit substantial stress and the void will perform an appropriate function of causing the stress to be properly steered in accordance with this invention. More particularly, if the slope of the initial linear portion of a stress versus strain curve of the material in the void is substantially less than the slope of the comparable portion of the stress versus strain curve of the material out of which the structure is made, then the void will operate as a void in accordance with the requirements of this invention. The preform of FIG. 3 can be made of a material which is much less stiff than is the material of the structure.

Some Theory Of Operation

The above description of the invention suggests certain aspects of why and how the invention operates. It might aid in comprehension of this invention to state what the applicant believes to be some of the reasons why this invention works as it does.

Essentially, what is involved through the use of the voids is a structuring of the mass so as to steer stress generated in the structure when a load is applied to the structure. The voids 12 prevent stress from going through the first matrix of points. That first matrix of points are equivalent to the four edge vertices of a closely packed set of RDs. The stress is channeled along the zone of the mass and tends to be transmitted through the faces of these geometrically defined RDs and thus, in part, through the second set of matrix points.

Such transmission eventually results in a steering of stress that provides an ultimate resolution of stress in terms of compressive stress within the material rather than tensile stress.

In broad general terms, it is believed that the resolution of stress is constrained to follow paths analogous to the paths that stress follows in a closely packed set of spheres. A closely packed set of spheres is a set of equal diameter spheres in which each sphere is surrounded by twelve other spheres. In such an arrangement, the spheres can only transmit compressive forces through their contact points. Of course, the sphere would fly apart if a force were applied to the set of spheres. Thus conceptually one has to think of the set of spheres as bounded by a barrier that prevents them flying apart. Under those conditions, all stress is transmitted within the barrier through the contact point of the spheres as stress in compression. Applicant believes that the arrangement of voids 12 at the first set of points which define the first matrix, creates bridges through the material which steers stress in an analogous fashion to a closely packed set of spheres.

It might be noted that a closely packed set of spheres contains a set of tetrahedral gaps and octahedral gaps. The number of gaps are three times the number of spheres. Two out of three of the gaps are tetrahedral gaps and one out of three is a octahedral gap. The cubic voids 12 of this invention have the same geometric positional relationship to one another as do the octahedral gaps in a closely packed set of spheres. Thus the hypothetical set of RDs can be considered to be a replacement for comparable spheres in which the tetrahedral gaps have been filled in and in which the octahedral gaps have been made into cubic voids as taught by this invention. The steering and resolution of stress through the material pathways in the structure of this invention is one that has some similarity to the manner in which stress is steered through the contact points in a closely packed set of spheres. Stress cannot be transmitted through the voids 12 (or the octahedral gaps among the spheres) and thus is transmitted along paths in which the stress is resolved by means of compression rather than tension.

Applicant believes that the above provides a partial explanation of what happens and at least give some indication of the type of stress resolution involved in the structure of this invention.

What is claimed is:

1. A stress steering structure comprising:
   a substance having a first set of voids, each member of said first set of voids encompassing one of a first set of predetermined points within said substance,
   said first set of predetermined points defining a first matrix wherein each of said points in said first matrix is spaced an equal distance from twelve and only twelve adjacent ones of said points in said first matrix,
   the volume of said first set of voids being substantially between approximately one percent and approximately fifty percent of the volume of said substance.

2. The stress steering structure of claim 1 wherein:
   substantially all of said first matrix points are encompassed by a separate member of said first set of voids.

3. The stress steering structure of claim 2 wherein:
   each member of said first set of voids is substantially cubic.

4. The stress steering structure of claim 3 wherein:
   the volume of said first set of voids is approximately 6.25 percent.

5. The stress steering structure of claim 3 wherein:
   said first set of voids are filled with a material that substantially transmits no force.

6. The stress steering structure of claim 5 having a predetermined load bearing surface wherein:
   each of said cubic voids is oriented so that one of its corner to corner axes is substantially perpendicular to said load bearing surface.

7. The stress steering structure of claim 1 wherein:
   said first set of points define the four-edge vertices of a closely packed set of rhombic dodecahedra.

8. The stress steering structure of claim 7 wherein said voids are defined by voids in a closely packed set of truncated rhombic docecahedra.

9. The stress steering structure of claim 8 wherein:
   the volume of said first set of voids is approximately 6.25 percent.

10. The stress steering structure of claim 8 wherein:
    said first set of voids are filled with a material that substantially transmits no force.

11. The stress steering structure of claim 10 having a predetermined load bearing surface wherein:
    each of said cubic voids is oriented so that one of its corner to corner axes is substantially perpendicular to said load bearing surface.

12. The stress steering structure of claim 1 wherein said voids are defined by voids in a closely packed set of truncated rhombic docecahedra.

13. The stress steering structure of claim 1 wherein:
    the volume of said first set of voids is approximately 6.25 percent.

14. The stress steering structure of claim 1 further comprising:
    a second set of voids,
    each member of said second set of voids encompassing one of a subset of points in a second set of predetermined points within said substance,
    said second set of predetermined points defining a second matrix wherein each of said points in said second matrix is spaced an equal distance from twelve and only twelve adjacent ones of said points in said second matrix,
    the distance between adjacent points in said second matrix being the same as the distance between the adjacent points of said first matrix,
    said subset of points being one-fourth of said second set of points, the members of said subset being equally spaced from one another,
    each member of said second set of voids being in communication with adjacent members of said first set of voids.

15. The stress steering structure of claim 14 wherein:
    said first and second sets of voids constitutes a continuous void in that each member of said first and second sets are in communication with adjacent voids.

16. The stress steering structure of claim 14 wherein:
    said first and second sets of voids are filled with a material that substantially transmits no force.

17. The stress steering structure of claim 14 wherein:
    said second set of points define the center points of a closely packed set of rhombic dodecahedra.

18. The stress steering structure of claim 14 wherein:
    each member of said first set of voids is substantially cubic, and
    each member of said second set of voids is substantially a truncated rhombic do decahedron.

19. The stress steering structure of claim 14 wherein:
    substantially all of said second matrix points are encompassed by a separate member of said second set of voids.

20. The stress steering structure of claim 19 wherein:
    substantially all of said first matrix points are encompassed by a separate member of said first set of voids.

21. The stress steering structure of claim 20 wherein:
    each member of said first set of voids is substantially cubic, and
    each member of said second set of voids is substantially a truncated rhombic dodecahedron.

22. The stress steering structure of claim 18 having a predetermined load bearing surface wherein:
    each of said cubic voids is oriented so that one of its corner to corner axes is substantially perpendicular to said load bearing surface.

23. The stress steering structure of claim 21 having a predetermined load bearing surface wherein:
    each of said cubic voids is oriented so that one of its corner to corner axes is substantially perpendicular to said load bearing surface.

24. The stress steering structure of claim 8 wherein:
the combined volume of said first set of voids and said second set of voids is approximately 30 percent.

25. A preform for manufacturing a stress steering structure having a predetermined set of voids, comprising:
a three dimensional set of interconnected elements,
each of said elements having a predetermined volume substantially equal to the volume of the void to be created in the stress steering structure manufactured with said preform,
each of said elements encompassing a separate one of a set of predetermined points,
each member of said set of points being spaced an equal distance from twelve and only twelve adjacent ones of said points in said set of points.

26. The preform of claim 25 wherein the material of said elements is substantially less stiff than is the material of the stress steering structure that is to be made employing said preform.

27. The preform of claim 25 wherein: the material of said set of elements can be volatilized upon manufacture of said stress steering structure using said preform.

28. The method manufacturing a stress steering structure in which the development of tension in response to loading is minimized, comprising the steps of:
selecting an appropriate structural substance,
creating a first set of voids within said substance, each member of said first set of voids encompassing one of a first set of predetermined points of a first three dimensional matrix,
each of said points in said first matrix being spaced an equal distance from twelve and only twelve adjacent ones of said points in said first matrix.

29. The method of manufacturing a stress steering structure of claim 28 further comprising the step of:
creating a second set of voids within said substance, each member of said second set of voids encompassing one of a predetermined subset of points in a second set of predetermined points,
said second set of predetermined points defining a second three dimensional matrix wherein each of said points in said second matrix is spaced an equal distance from twelve and only twelve adjacent ones of said points in said second matrix,
the distance between adjacent points in said second matrix being the same as the distance between the adjacent points of said first matrix,
said points of said first and second matrices being separate from one another,
said subset of points being one-fourth of said second set of points, the members of said subset being equally spaced from one another,
each member of said second set of voids being in communication with adjacent members of said first set of voids.

30. The method of manufacturing a stress steering structure of claim 29 comprising the step of:
filling said voids with a material that is substantially less stiff than is said substance of said structure.

* * * * *